United States Patent [19]

Halsell

[11] Patent Number: 5,285,957
[45] Date of Patent: Feb. 15, 1994

[54] REPULPABLE, REINFORCED CORRUGATED CONTAINERS

[75] Inventor: H. Lee Halsell, Mountainburg, Ark.

[73] Assignee: The Mead Corporation, Dayton, Ohio

[21] Appl. No.: 9,559

[22] Filed: Jan. 26, 1993

[51] Int. Cl.⁵ .............................................. B32B 3/28
[52] U.S. Cl. .............................. 229/199; 229/3.5 R; 229/939; 428/182; 428/903.3
[58] Field of Search ............. 229/3.5 R, 199, DIG. 2, 229/DIG. 5; 220/441, 443; 428/34.2, 35.6, 182, 184, 903.3

[56] References Cited

U.S. PATENT DOCUMENTS

| 1,184,749 | 5/1916 | Hicks . | |
|---|---|---|---|
| 1,605,953 | 11/1926 | Howard . | |
| 3,307,994 | 3/1967 | Scott, Jr. | 229/3.5 R |
| 3,411,689 | 11/1968 | Brackett | 229/3.5 R |
| 3,904,800 | 9/1975 | Neubauer | 428/182 |
| 4,232,074 | 11/1980 | Chavannes | 428/182 |
| 4,339,292 | 7/1982 | Itoh et al. | 156/206 |
| 4,348,450 | 9/1982 | Shaw | 428/182 |
| 4,358,498 | 11/1982 | Chavannes | 428/182 |
| 4,398,650 | 8/1983 | Holmes et al. | 220/443 |
| 4,451,515 | 5/1984 | Clausen et al. | 428/182 |
| 4,452,837 | 6/1984 | Chausen et al. | 428/34.2 |
| 4,655,366 | 4/1987 | Sykes | 220/441 |
| 4,702,408 | 10/1987 | Powlenko | 229/199 |
| 4,718,597 | 1/1988 | Bishop | 229/199 |

FOREIGN PATENT DOCUMENTS 4120819 1/1992 Fed. Rep. of Germany ...... 229/199

Primary Examiner—Gary E. Elkins
Attorney, Agent, or Firm—Biebel & French

[57] ABSTRACT

A repulpable reinforced corrugated container, such as a bulk bin, is reinforced with a mesh composed of natural, cellulosic strands, such as jute. The reinforcing material may be placed intermediate the outer liner and inner liner of a two faced corrugated board construction. The reinforced container is repulpable without significantly affecting fiber recover.

13 Claims, 3 Drawing Sheets

FIG·1

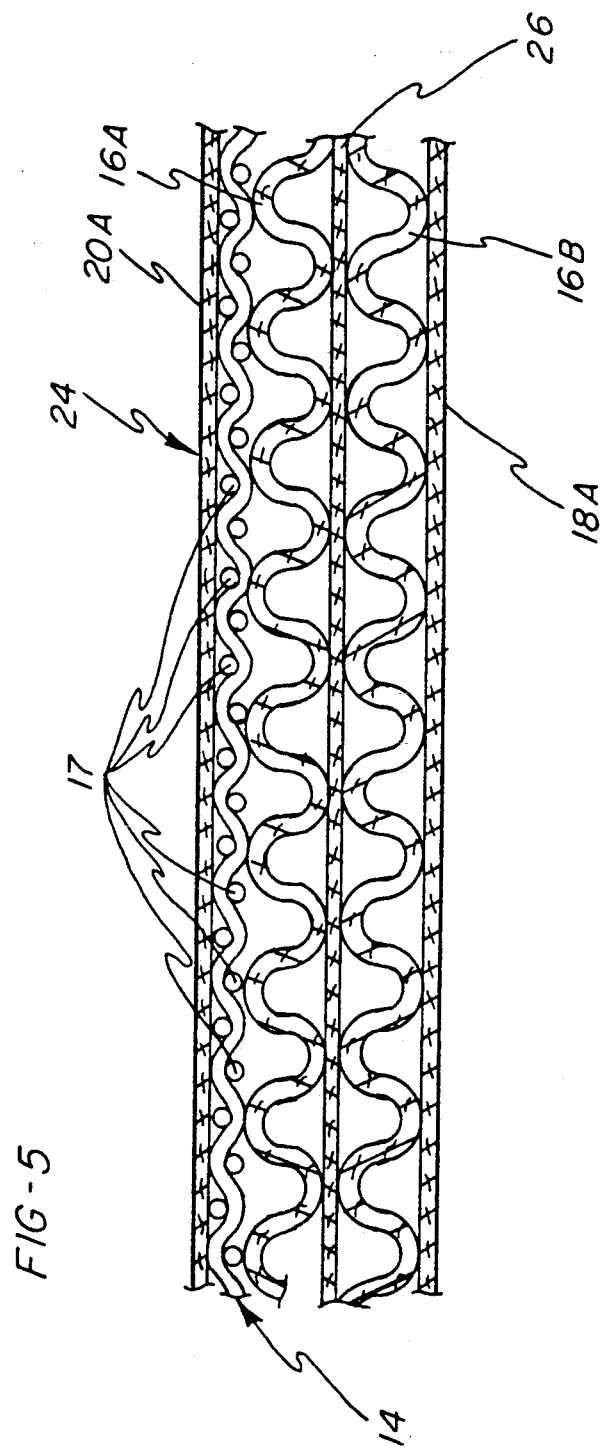

REPULPABLE, REINFORCED CORRUGATED CONTAINERS

FIELD OF THE INVENTION

The present invention pertains to reinforced corrugated containers of the type commonly referred to as bulk bins. More specifically, the invention relates to a repulpable, reinforced bulk bin container.

BACKGROUND OF THE INVENTION

The use of reinforcement strips or strands in conjunction with corrugated board is well known. For example, in U.S. Pat. No. 1,605,953 (Howard) unspun reinforcing fibers are adhered preferably between layers of a two ply facing sheet that is in turn adhered to corrugated paper.

Coated rayon strands are placed between the outer liner and the corrugated medium in U.S. Pat. No. 4,398,650 (Holmes et al). The coating is a thermoplastic resin material having a softening point such that it enables the strand to become adhered in place under the temperature and time conditions prevailing in the corrugating machine.

Large corrugated cartons having non-woven backing material with yarns laminated therein as reinforcement medium are disclosed in U.S. Pat. No. 4,655,366 (Sykes). Here, a belt of backing material is disposed entirely around the carton sidewalls or the tubular liner and extends upwardly for a distance from the container bottom. The belted backing material comprises a non-woven polyester with a plurality of parallel fiberglass filaments laminated therein.

U.S. Pat. Nos. 1,184,749 (Hicks) and 4,339,292 (Iton et al) are also noted as being of possible interest.

Although the prior art means of reinforcement provide strong durable container products it has been difficult to repulp same due primarily to the inclusion therein of synthetic polymer reinforcing mediums which may lead to unacceptable fiber recovery levels in the repulping process and/or "stickies" which deleteriously affect subsequent paper making processes. Stickies are impurities that can cause tears during the paper making process.

Despite the prior art efforts, there remains a need in the art to provide a strong and durable reinforcing medium for corrugated cartons and the like.

Moreover, due to ecological concerns, it is even important to provide a strong, durable reinforced corrugated container that may be repulped, providing acceptable fiber recovery during the repulping so that the corrugated container material may be recycled for subsequent use.

SUMMARY OF THE INVENTION

The above and other concerns are met by the present invention wherein, as a reinforcement medium for a corrugated container, a mesh-like assemblage of natural, cellulosic strands is provided. The assemblage may comprise any of a variety of woven, knitted, or non-woven meshes. The term "mesh" is used herein to denote an open network of interlaced, interlocking, webbed, matted, or needle-punched strands.

Based upon presently available experimental data, it is preferred to use a woven mesh composed essentially of jute fibers. In addition to jute, other natural cellulosic fibers such as cotton, ramie, hemp, and flax may also be mentioned.

The reinforcing mesh may, for example, be located in one or more of a variety of locations in a corrugated construction. For example, it can be interposed between the outer or inner liner and fluted media in a corrugated construction or it can be used in a double-walled corrugated construction wherein two fluted mediums are employed.

The invention will be further defined in accordance with the accompanying drawings and appended claims.

DESCRIPTION OF THE DRAWINGS

FIG. 5 is a sectional view of another embodiment taken from a disposition similar to that used in FIG. 3.

DETAILED DESCRIPTION OF THE PREFERRED EMBODIMENT

Figure 1:
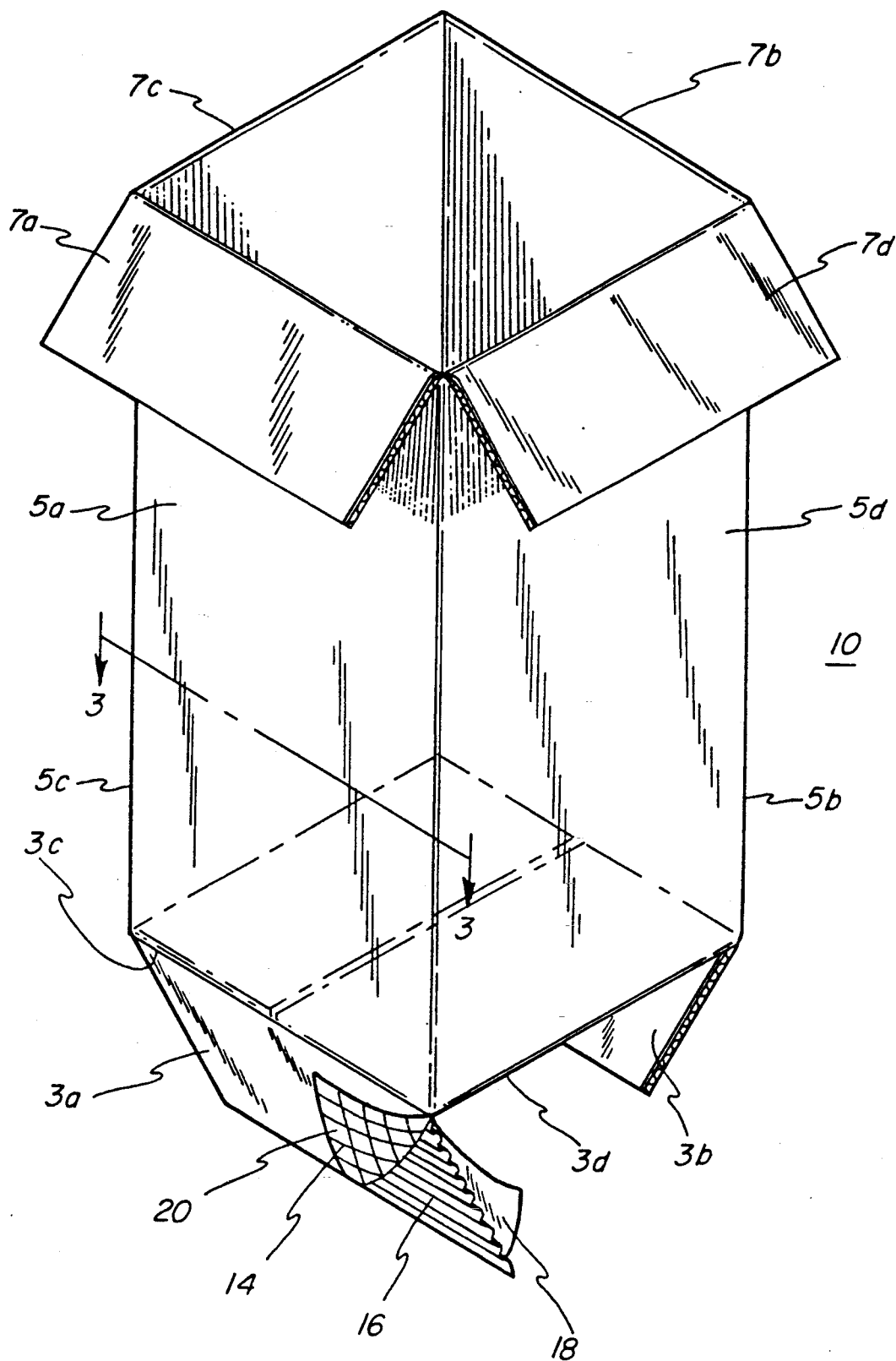
FIG. 1 is a perspective view of a corrugated bulk bin in accordance with the invention with a cut-away portion showing the reinforcing medium located in a bottom panel of the bin.

Referring to the drawings and specifically to FIG. 1 thereof, there is shown a corrugated bulk bin type container 10 comprising bottom panels 3a,b,c,d and upstanding longitudinal panels 5a,b,c,d connected to the bottom. Top flaps 7a,b,c,d connected to the top ends of the longitudinal panels together upon folding form the top panel of the bin.

These bins are made of corrugated paperboard and may be of a single or double wall construction. A loaded bin may carry as much as from 1,000-2,500 pounds of bulk material.

Portions of the bin are provided with reinforcing material 14 as can be seen in the cut-away portion of FIG. 1. The reinforcing material is generally placed at those portions of the container 10 that will encounter the most stress upon loading or shifting of the materials to be shipped or stored therein. As shown, bottom panel 3a is provided with reinforcing material 14 as well as are defined heights of longitudinal panels 5a,b,c,d that extend upwardly from the bottom of the container. It will be appreciated that the reinforcement material 14 may be placed at a variety of locations around the bin structure, or, in some cases, the entire assembly may need reinforcement.

Figure 3:
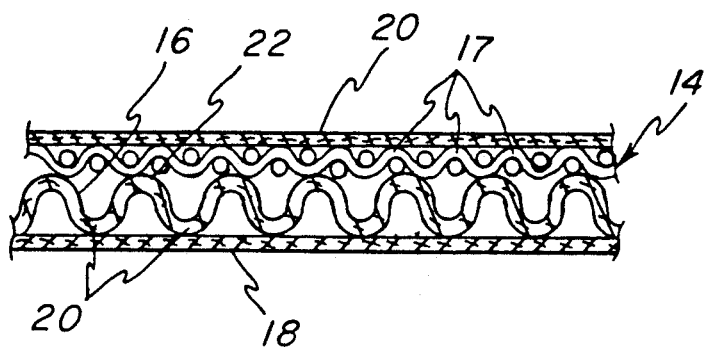
FIG. 3 is a sectional view of the bulk bin in FIG. 1 taken along the lines and arrows 3—3 in FIG. 1.
Figure 4:
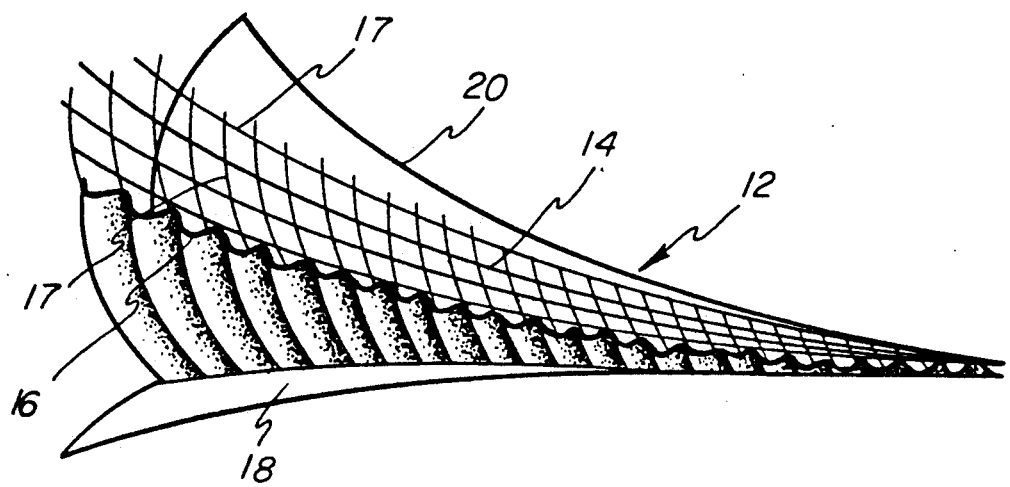
FIG. 4 is an exploded perspective view of the section of the corrugated bulk bin shown in FIG. 3.

As can be best seen in FIGS. 3 and 4, and with regard to longitudinal panel 5a, the bin structure, in the areas of reinforcement, comprises an outer liner 20, intermediate corrugated or fluted medium 16 and inner liner 18. Inner liner 18 is adhered to the corrugated medium 16 by conventional adhesives. Interposed between corrugated medium 16 and outer liner 20 is reinforcing material 14 comprising a mesh like assemblage of natural, cellulosic fibers. Two-way dimensional stability is imparted to the bin by use of reinforcing material 14 due to its provision of strands (i.e., fibers or yarns) in an interlocking or interlacing pattern.

Reinforcement material 14 is adhered to corrugated medium 16 by conventional water soluble glues such as the starch based adhesives. The entire assembly of inner and outer liners 18,20, intermediate corrugated medium 16 and reinforcement 14 may be assembled in conventional equipment such as the type schematically illustrated in FIG. 9 of U.S. Pat. No. 4,398,650, hereby incorporated by reference herein.

Figure 2:
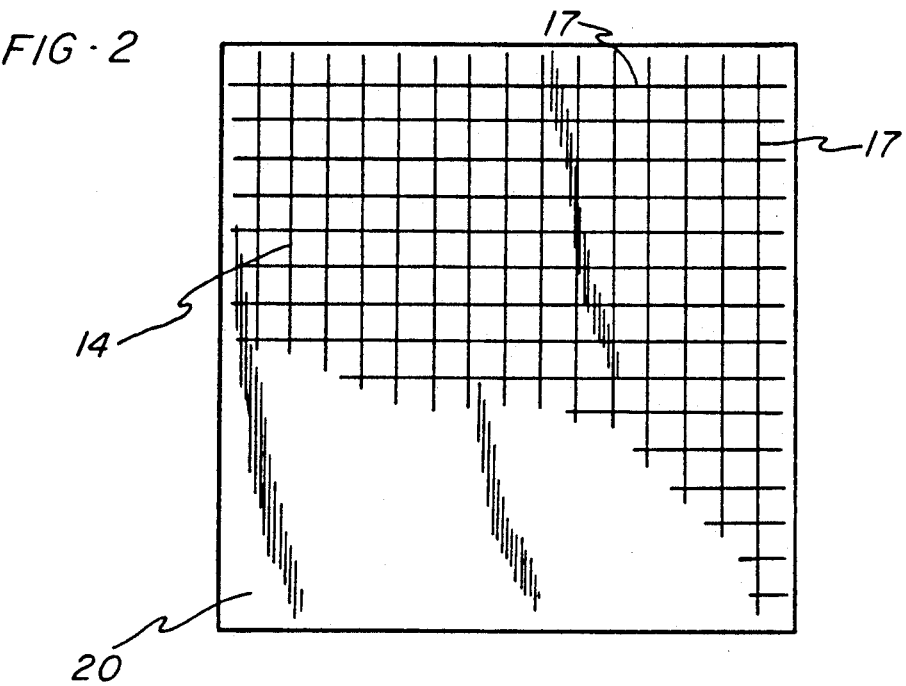
FIG. 2 is a plan view of a preferred outer lining member having a mesh of natural cellulosic strands preadhered to the inside face thereof.

Turning now to FIG. 2 of the drawings, there is shown the preferred reinforcing material 14 comprising woven jute strands 17. The woven strands are pre-adhered to desired portions of outer liner 20 corresponding to those locations in the constructed bin structure where reinforcement is desired. Woven jute mesh pre-adhered to liner paper is available from Mid-America Overseas Company, Louisville, Ky. As shown, the reinforcing material comprises a two dimensional woven fabric, but the artisan will appreciate that for increased reinforcement along the bias or diagonal direction, triaxial weaves may also be chosen.

As previously mentioned, any one of the natural, cellulosic fibers may be used for the reinforcement material 14. Important criteria include the desirability of providing adequate fiber recovery during repulping operations and the provision of increased strength or reinforcement to the desired areas of the container.

FIG. 5 depicts an alternative embodiment incorporating the reinforcing material 14 in a double wall construction. Here, in the double wall board 24, two layers of corrugated media 16A and 16B are provided between the inner liner 18A and outer liner 20A. The first corrugated media 16A is positioned adjacent to the outer liner 20A and an intermediate liner 26. The second corrugated media 16B is adhered to the inner liner 18A and intermediate liner 26. The reinforcing material 14 is interposed between the outer liner 20A and first corrugated media 16A. Here again, the preferred reinforcement material 14 of FIG. 2 may be used. In this case since the reinforcing material 14 is pre-adhered to outer liner 20A, the composite sheet comprising liner 20A and reinforcing material 14 is placed over the corrugated medium 16A and glued thereto by conventional means.

It should also be understood that the reinforcing material 14 can be incorporated into a plurality of mesh layers to provide additional strength to the corrugated board 12 and that the mesh may be disposed such that the strands provide dimensional stability in a plurality of directions.

The invention will now be further described with regard to the following example which is intended for illustrative purposes and should not be construed as limiting the invention.

EXAMPLES

In order to assess the compatibility of the reinforcing material 14 in repulping processes, a comparative example was undertaken. Two corrugated containers were provided, with the only difference in the two being the provision of the preferred woven jute reinforcing material 14 in one container. The reinforcing corrugated container comprised 93.3% of corrugated material and 6.7% of jute material. This is an equivalent of 28 ounces of jute in a 24 pound box. Typical repulping conditions were employed, comprising solution temperature of 100° F., pH 7.0. A 10 mil screen was used.

Fiber recovery from both the non-reinforced container and reinforced container was measured after 15 minutes, 30 minutes, 45 minutes and 60 minutes. Results are shown in Table I.

TABLE I

| | FIBER RECOVERY | | | |
|---|---|---|---|---|
| | 15 Min. | 30 Min. | 45 Min. | 60 Min. |
| 100% Corrugated Material | 91.4% | 94.0% | 95.0% | 95.6% |
| Reinforced Corrugated Material | 81.8% | 92.7% | 92.5% | 93.7% |

In order to assess the performance of the reinforced corrugated material, handsheets made from recovered fiber were tested for critical performance properties. In each case, handsheets were made from the fiber recovered after 60 minutes of repulping. There was no evidence of "stickies" formation. Results are shown in Table II.

TABLE II

| | Handsheet Performance | | | | |
|---|---|---|---|---|---|
| | Basis Weight $g/m^2$ | Tensile $Nm/g$ | Absorption $lb/ft^2$ | Strain | Ring Crush Lb. of Force |
| Fibers Recovered from 100% Corrugated Material | 60.6% | 32.6 | 1.85 ft. | 2.24% | 11.7 |
| Fibers Recovered from Reinforced Corrugated Material | 61.3 | 34.6 | 1.87 ft. | 2.08% | 13.2 |

The fiber recovery tests showed that the presence of the jute reinforcing material 14 nominally reduced fiber recover, especially after short repulping times. Although a level of 90% or better fiber recovery after 15 minutes is optimal, fiber recovery levels of 80% or greater, as demonstrated by the reinforced corrugated container of the invention, are acceptable and will not prevent repulping use. On the other hand, strength characteristics of the tested handsheets made from fibers recovered from the reinforced corrugated containers of the invention showed improvement over the comparative prior art corrugated containers.

It is apparent that use of the reinforcing material 14 provides acceptable repulping characteristics while at the same time providing more than adequate strength characteristics to the container. Although the reinforcing material 14 has been shown herein as being disposed between the corrugated medium and outer liner in a single wall or double wall corrugated box construction, it can be well imagined that the reinforcing material could also be located intermediate the corrugated medium and the inner liner or in a variety of other locations.

Moreover, in the two wall constructions of the type shown generally in FIG. 5, in addition to the placement of reinforcing material 14 as shown therein between first corrugated medium 16A and outer liner 20a, reinforcing medium could also be positioned intermediate corrugated medium 16B and inner liner 18a and/or reinforcing material 14 could also be positioned on either the top (outer) side or bottom (inner) side of intermediate liner 26.

As used herein, the term "repulpable" shall be defined as having the capability of providing 80% or greater fiber recovery after 15 minutes of conventional repulping as reported in the example, supra.

While the forms of apparatus herein described constitute a preferred embodiment of this invention, it is to be understood that the invention is not limited to these precise forms, and that changes may be made therein without departing from the scope of the invention which is defined in the appended claims.

What is claimed is:

1. A repulpable material useful for forming a reinforced corrugated container, said material comprising:
   a lining member;
   a corrugated medium member;
   a reinforcing material positioned adjacent at least one of said lining member and corrugated medium member, said reinforcing material comprising a mesh of natural, cellulosic strands.

2. Repulpable material as recited in claim 1 wherein said reinforcing material is positioned intermediate said lining member and said corrugated medium member.

3. Repulpable material as recited in claim 1 wherein said reinforcing material comprises a woven mesh.

4. Repulpable material as recited in claim 3 wherein said reinforcing material comprises strands composed essentially of jute.

5. A repulpable corrugated paper material useful for forming a corrugated container, said material comprising:
   an outer liner of paper board material;
   a corrugated medium of paper board material;
   an inner liner of recyclable paper board material, said corrugated medium disposed intermediate said outer liner and said inner liner; and
   at least one reinforcing layer positioned adjacent said corrugated medium and comprising a mesh of natural cellulosic strands.

6. A material as recited in claim 5 wherein said reinforcing layer is disposed intermediate said outer liner and said corrugated medium.

7. A material as recited in claim 5 wherein said reinforcing layer is disposed intermediate said corrugated medium and said inner liner.

8. A material as recited in claim 5 wherein said reinforcing layer comprises strands of jute.

9. A material as recited in claim 8 wherein said reinforcing layer comprises woven jute mesh.

10. A repulpable corrugated paper material comprising:
    a pair of liners of paper board material, one of said liners defining an outside surface of said material and the other of said liners defining an inside surface of said material;
    a plurality of corrugated mediums each positioned intermediate said pair of liners; and
    at least one reinforcing layer intermediate said outside surface and said inside surface and positioned adjacent to one of said liners said reinforcing layer comprising a mesh of natural, cellulosic strands.

11. A material as recited in claim 10 wherein said reinforcing layer is adhesively secured to one of said liners.

12. A material as recited in claim 10 wherein said reinforcing layer is composed essentially of jute strands.

13. A material as recited in claim 12 wherein said reinforcing layer comprises woven jute strands.

* * * * *